(12) United States Patent
Shang et al.

(10) Patent No.: US 8,560,361 B2
(45) Date of Patent: *Oct. 15, 2013

(54) PREDICTING DYNAMIC TRANSPORTATION DEMAND WITH MOBILITY DATA

(75) Inventors: Wei Xiong Shang, Beijing (CN); YiBo Zhang, Beijing (CN); Jin Zhou, Beijing (CN); Yan Feng Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,792

(22) Filed: Apr. 27, 2012

(65) Prior Publication Data

US 2012/0215586 A1 Aug. 23, 2012

Related U.S. Application Data

(63) Continuation of application No. 13/332,245, filed on Dec. 20, 2011.

(51) Int. Cl.
*G06Q 10/00* (2012.01)

(52) U.S. Cl.
USPC ............................ 705/7.11; 705/7.15

(58) Field of Classification Search
USPC ............................ 705/7.11, 7.15
See application file for complete search history.

(56) References Cited

U.S. PATENT DOCUMENTS

| | | | |
|---|---|---|---|
| 7,479,901 B2 * | 1/2009 | Horstemeyer | 340/994 |
| 2006/0293046 A1 * | 12/2006 | Smith | 455/423 |
| 2007/0010941 A1 | 1/2007 | Marsh | |
| 2008/0081641 A1 * | 4/2008 | Smith et al. | 455/456.3 |
| 2010/0039254 A1 * | 2/2010 | Cooper et al. | 340/539.11 |

FOREIGN PATENT DOCUMENTS

WO 2007002118 1/2007

OTHER PUBLICATIONS

U.S. Appl. No. 13/332,245, filed Dec. 20, 2011, Shang, Wei Xiong et al.
Aerde, Michel V. et al., "Estimation of O-D Matrices: The Relationship Between Practical and Theoretical Considerations", TRB Annual Meeting CD-ROM 2003 , 18 pages.
Pendyala, Ram M. et al., "FAMOS: The Florida Activity Mobility Simulator", Conference on "Progress in Activity-Based Analysis" Vaeshartelt Castle, Maastricht, The Netherlands May 28-31, 2004 , 28 pages.
Zhu, Yanfeng , "Trajectory Enabled Service Support Platform for Mobile Users' Behavior Pattern Mining", Mobile and Ubiquitous Systems: Networking & Services, MobiQuitous, 2009. MobiQuitous '09. 6th Annual International Obtained from internet: http://ieeexplore.ieee.org/application/mdl/mdlconfirmation.jsp?arnumber=5326410 2009 , 10 pages.
U.S. Appl. No. 13/332,245 Office Action, Feb. 20, 2013 , 25 pages.

* cited by examiner

*Primary Examiner* — Mark A Fleischer
(74) *Attorney, Agent, or Firm* — DeLizio Gilliam, PLLC

(57) ABSTRACT

A travel information server estimates travel demand with mobility data. The server identifies activity types of users based, at least in part, on mobility data of the users. The mobility data has been collected over time and indicates at least locations and corresponding times at the locations. Travel information is generated with the mobility data for each of the activity types. The travel information for a first of the activity types is adjusted based, at least in part, on travel-related event data that corresponds to the first activity type to generate an adjusted travel information for the first activity type. The travel-related event data indicates an event that potentially influences travel for a short term computing an estimated travel demand with a combination of the adjusted travel information for the first activity type and the travel information for at least a second of the activity types.

10 Claims, 14 Drawing Sheets

|  | Origination Zone | | | |
|---|---|---|---|---|
|  | 1 | 2 | 3 | 4 |

| Destination Zone | | | | | |
|---|---|---|---|---|---|
| | 1 | x | 0 | 0 | 0 |
| | 2 | 0 | x | 0 | 0 |
| | 3 | 0 | 0 | x | 0 |
| | 4 | 0 | 0 | 0 | x |

FIG. 5A

|  | Origination Zone | | | |
|---|---|---|---|---|
|  | 1 | 2 | 3 | 4 |

| Destination Zone | | | | | |
|---|---|---|---|---|---|
| | 1 | x | 107 | 795 | 123 |
| | 2 | 53 | x | 421 | 209 |
| | 3 | 78 | 69 | x | 43 |
| | 4 | 63 | 90 | 627 | x |

FIG. 5B

PREDICTING DYNAMIC TRANSPORTATION DEMAND WITH MOBILITY DATA

RELATED APPLICATIONS

This continuation application claims the benefit under 35 U.S.C. §120 of U.S. patent application Ser. No. 13/332,245 filed Dec. 20, 2011. U.S. patent application Ser. No. 13/332, 245 claims benefit under 35 U.S.C. §119 of Chinese Application No. 201110027185.1, which was filed Jan. 24, 2011.

BACKGROUND

The present inventive subject matter relates to a demand data acquisition technology, and more particularly, to a method and an apparatus for providing travel information.

Transportation demand data are crucial to urban transportation planning (such as road planning, subway planning, etc.) as well as transportation facility configuration. Traditionally, transportation demand data acquisition is mainly conducted through paper survey on citizens. Paper survey not only consumes labor and financial resources, but also takes a rather long time to obtain data. Moreover, the data obtained from such a survey are generally static and long-term statistics, which therefore can only be applied to handle long-term issues such as planning and development.

Data acquired in such a way lag behind the current transportation demand and cannot be suitable for various changes. Thus, various kinds of planning, provisions and measures that are made based on these data usually cannot achieve the expected objectives.

Hence, a desire for "dynamic transportation demand," which means a time varying traffic flow, has become more and more urgent. Dynamic transportation demand is generally influenced by transportation facility and behaviors of people. Dynamic transportation demand is basic information for fine tuning transportation facilities, traffic lights, and short-term transportation policies. While a temporal event occurs, a decongestion scheme may be designed also based on such information.

It is known that in many countries and regions, the coverage of mobile communication networks has reached at least 90%, and mobile communication devices have become increasingly prevalent. Further, mobile networks can record a user's positions based on cell-towers, which provides a possibility of obtaining a sojourn of people at a specific location. Thus, transportation demand data may be acquired based on the mobile network. Its basic principle is to obtain main positions of people within predetermined regions, for example, "home," "office," "school," "shopping region," etc., and obtain potential behaviors of the people from the mobility data based on these positions.

SUMMARY

Embodiments of the inventive subject matter include a method for estimating travel demand with mobility data. The method identifies activity types of users based, at least in part, on mobility data of the users. The mobility data has been collected over time and indicates at least locations and corresponding times at the locations. Travel information is generated with the mobility data for each of the activity types. The travel information for a first of the activity types is adjusted based, at least in part, on travel-related event data that corresponds to the first activity type to generate an adjusted travel information for the first activity type. The travel-related event data indicates an event that potentially influences travel for a short term computing an estimated travel demand with a combination of the adjusted travel information for the first activity type and the travel information for at least a second of the activity types.

BRIEF DESCRIPTION OF THE DRAWINGS

The present embodiments may be better understood, and numerous objects, features, and advantages made apparent to those skilled in the art by referencing the accompanying drawings.

FIGS. 5A and 5B schematically illustrate a diagram of an O-D matrix.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

The term "activity" refers to the moving behavior of people with a particular purpose. "Moving behavior" may be represented by a sequence containing time and locations, which reflects when a user starts from which place to which destination, and stops at which places in between; and it includes origination, destination, sojourn locations, and corresponding time. The term "sojourn" refers to a temporary stop or location of a temporary stop. The location of a temporary stop is also referred to as a sojourn location. Although being at home for 10 hours a day is also temporary with respect to an entire day or longer period of time, this description considers stops of a longer duration, such as being at home or work, a more stable stop and not a temporary stop or temporary location. The "particular purpose" of a moving behavior refers to the reason of a moving behavior, for example, going to work, shopping, taking children to school, picking up children from school, going to work plus taking children to school, etc. The term "nature of location" refers to the corresponding meaning of the location, such as school, shopping place, etc. The term "moving mode" refers to the mode by which the user performs the moving behavior, for example, by bike, by a private car, by bus, etc. The term "mobility data" refers to data indicating location information and corresponding time of the user, which may come from the mobile communication network, where the location information may be for example a cell ID. The term "travel-related event" refers to an event that potentially influences travel of people temporally, in a short time, or in a short term; it comprises events such as short time traffic flow restriction or temporal transportation regulation, as well as some transportation regulation measures or regulations, such as "adjusted work hours," etc.

Figure 1:
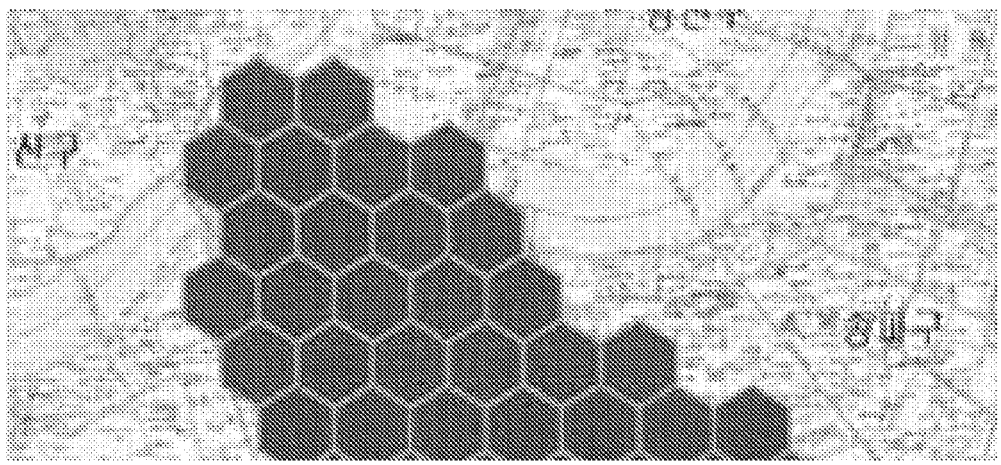
FIG. 1 schematically illustrates a diagram of correspondence relationships between cells of a mobile network and actual physical positions.
Figure 2:
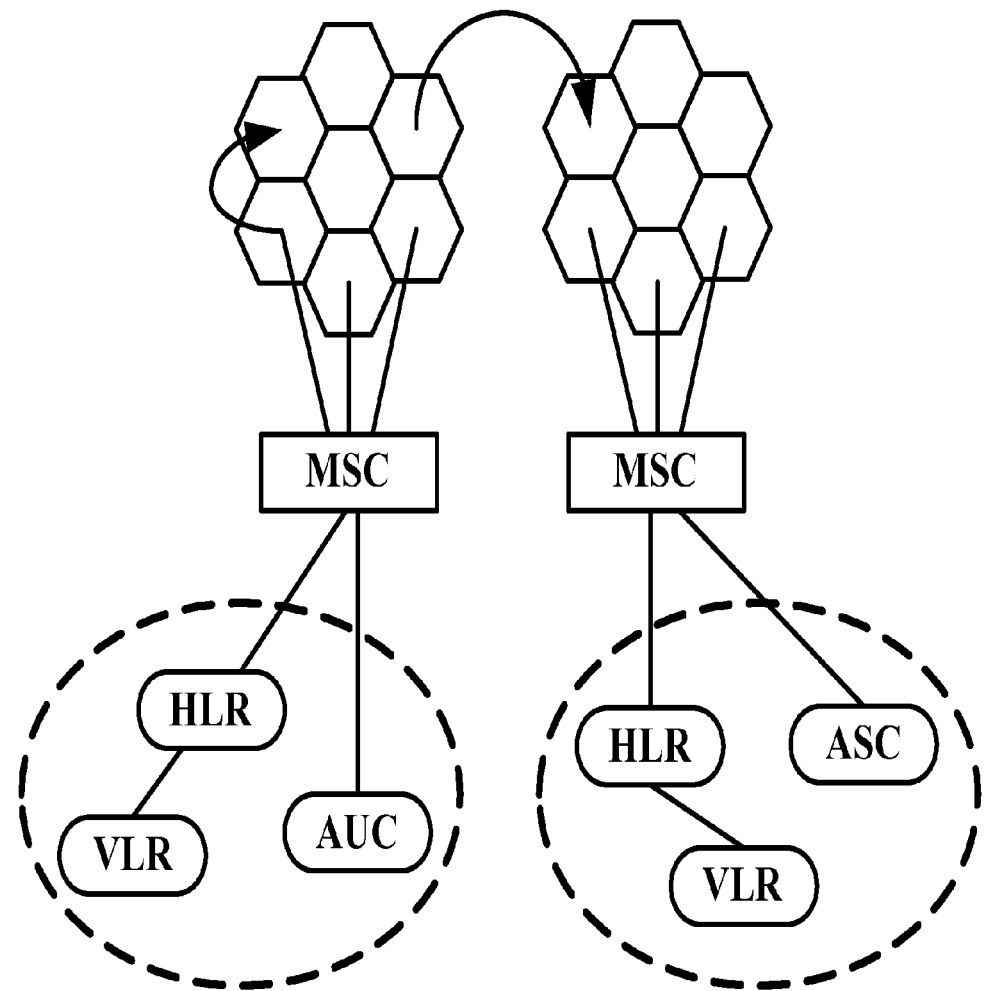
FIG. 2 schematically illustrates an exemplary structure of devices in a mobile network.

A mobile communication network from which mobility data may be obtained will be briefly described with reference to FIG. 1 and FIG. 2, wherein FIG. 1 schematically illustrates a diagram of correspondence relationships between cells of a mobile network and actual physical locations; and FIG. 2 schematically illustrates an exemplary structure of a mobile network system.

As illustrated in FIG. 1, a mobile communication network generally comprises several cellular cells that substantially cover respective areas. In many countries and regions, the coverage rate has amounted to more than 90%. As illustrated in the figure, areas in the map have been illustrated as having been completely covered by a plurality of corresponding cells represented by hexagons. Each cell may be mapped to an actual physical location. Various approaches may be employed to establish a mapping or corresponding relationship between cells of the mobile network and physical locations. For example, these correspondence relationships may be established by exploiting information such as geographical location data in a geographical information system, and cell locations in the mobile communication network.

Reference is made to FIG. 2, which schematically illustrates an exemplary structure of a mobile network system. As illustrated in FIG. 2, in the mobile communication network, there is generally provided a base station (BS) in each cell, and mobility data of a mobile user will be transited to a mobile switch center through the BS in a corresponding cell. Each mobile switching center (MSC) generally manages several cells and is responsible for managing the function of call connection, handover control, radio channel management, and etc. In each MSC, there is included a home location register (HLR), a visitor location register (VLR), and an authentication center. The HLR is responsible for a data region of the mobile user management, and stores user home information and the current location information. The VLR serves mobile users within its control area and stores information on a registered mobile user that has entered into its managed area. Once the mobile user leaves the controlled area of the VLR, then re-registration will be made in another VLR that manages the area into which he enters, while the original VLR will no longer record the mobile user data. The AUC is for implementing functions such as user authentication. Thus, it is very clear that mobility data containing locations (particularly cell locations) and time may be obtained in the mobile switch center.

Next, a plurality of embodiments of a method for providing traveling information according to the present inventive subject matter will be described with reference to FIGS. 3 to 8. First, with reference to FIG. 3, FIG. 3 illustrates a flowchart of a method for providing travel information according to one embodiment of the present inventive subject matter.

Figure 3:
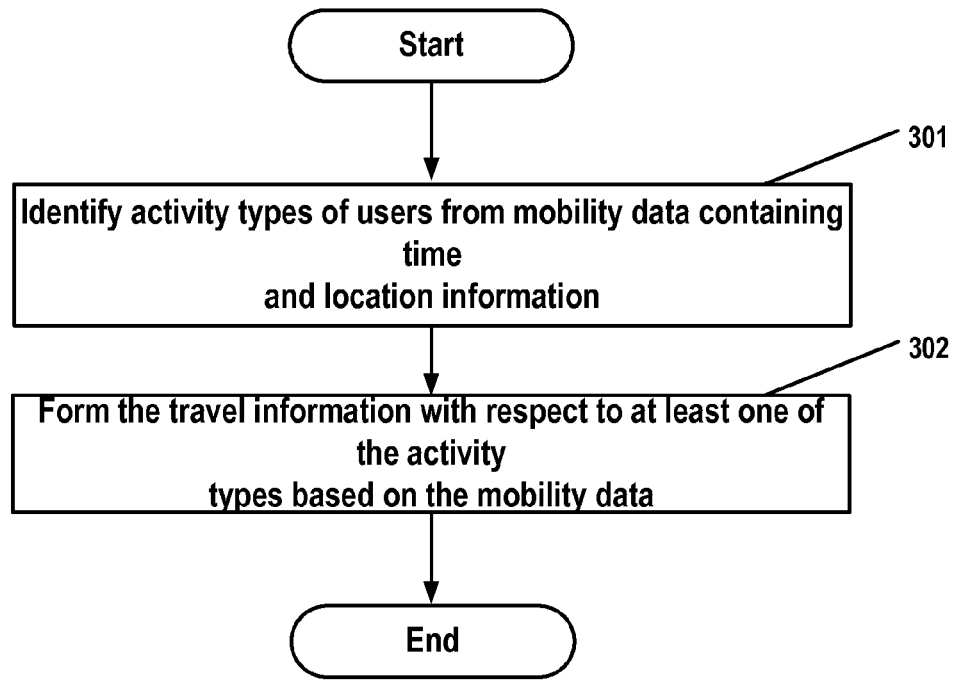
FIG. 3 illustrates a flow chart of a method for providing travel information according to an embodiment of the present invention.

As illustrated in FIG. 3, first, at step 301, activity types of users are identified from mobility data containing time and location information.

From the description with reference to FIG. 2, it is seen that the mobility data containing time and location information can be obtained from the mobile communication network, particularly from the mobile switch center. Generally, the MSC will record the location of the user and the corresponding time in the process of using a mobile device, for example, during calling, sending and receiving an SMS, or browsing webpage data, or performing packet switched (data downloading and data uploading). Therefore, call data, SMS data, webpage browsing data, and packet switched data may all be used as mobility data employed in the present inventive subject matter. Further, it is also known that, when the mobile device is in a standby mode, location area handover data will be generated in case of crossing a location area during the moving process of the user, and such location area handover data likewise contain time and location information. Therefore, location area handover data may also be employed in the present inventive subject matter.

Additionally, a "public transportation card integrated cell phone" has arisen, where the cell phone may be directly used to perform card-swiping charging when taking a bus or a taxi. Such data, generally also carrying data like payment time and location of the mobile device, can also be used in the present inventive subject matter. Further, these inventors also notice that with the prevalence of public transportation cards, account transaction data for the public transportation cards will also carry information like transaction time, sites of getting on/off, and time. Such information may likewise reflect the moving state of the user, and is thus used in the present inventive subject matter.

Daily moving behaviors of users may be determined based on these mobility data. The moving behavior refers to a sequence of information containing time and locations, which reflects when the user is at which location. Then, the purpose for the moving behaviors can be determined based on the nature and/or time of these locations. Next, the activity types can be determined based on the moving behaviors and behavior targets thereof Regarding the process of these operations, description will be made in detail hereinafter.

It should be noted that one day of moving data is obtained in order to reflect the daily activities of each user. However, in order to obtain more accurate daily activity information, mobility data for more days may be employed, for example the mobility data for one month, three months, half a year, or within any suitable period of time.

Next, embodiments of determining various activity types based on mobility data will be described in detail with reference to FIGS. 4A to 4E.

Figure 4A:
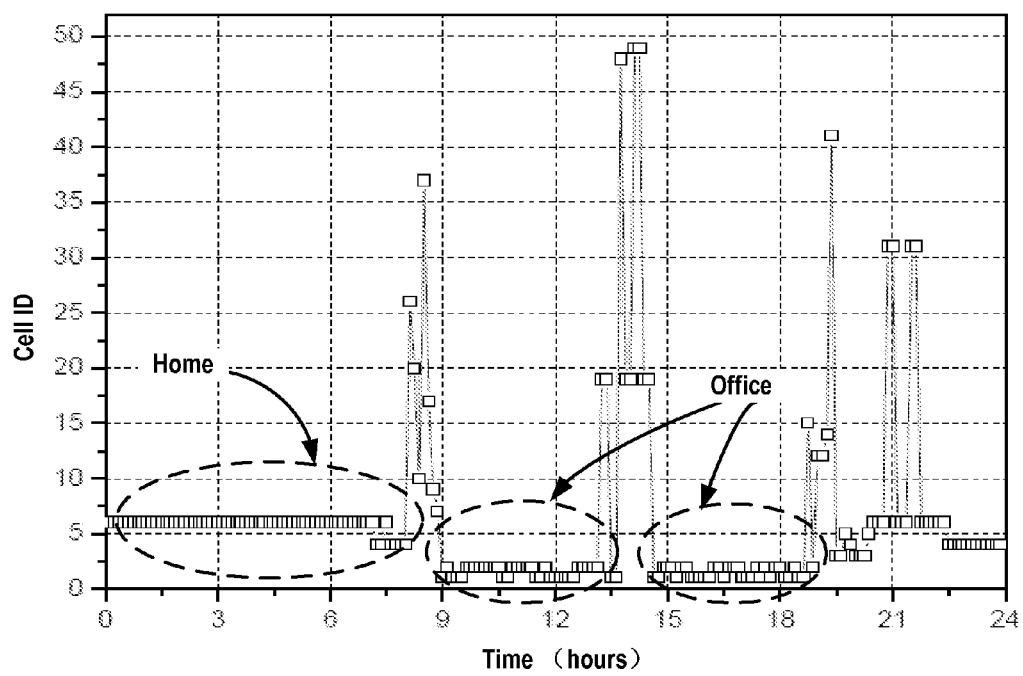
FIG. 4A schematically illustrates a diagram of identifying meaningful locations.

Reference is made to FIG. 4A, which schematically illustrates a diagram of a method of identifying meaningful locations. Specifically, FIG. 4A illustrates time and location information indicated by mobility data of a user, where the X axis represents time in one day and the Y axis represents locations indicated by Cell IDs. As illustrated in FIG. 4A, the user sojourns within cells with IDs of 6 and 4 for a long time between 0:00 and 8:00 am; from 9:00 am to 13:00 pm and from 15:00 pm to 19:00 pm, the user substantially sojourns within cells with Cell IDs of 2 and 3; and afterwards till 21:00 pm, the user is substantially located within cells with Cell IDs of 6 and 4. In addition, there are some moving behaviors between 8:00 am and 9:00 am, between 13:00 pm and 14:30 pm, and between 19:00 pm and 20:00 pm.

Based on the data in FIG. 4A, it can be determined that Cell 6 and Cell 4 are locations for long-term sojourn, so are Cell 2 and Cell 3. These locations are originations and destinations of major daily moving behaviors of the user. The originations and destinations may be determined based on the feature of the data themselves. For example, for the moving behavior between approximately 8:00 am and 9:00 am as illustrated in the figure, the user starts activity from Cell 6 and Cell 4 in which they have been static for a long time, and sojourns within Cell 2 and Cell 3 after arriving at Cell 2 and Cell 3, which means for the moving behavior between 8:00 am and 9:00 am, Cell 6 and Cell 4 are origination, while Cell 3 and Cell 2 are destination. Therefore, for example for the moving behavior between 8:00 am and 9:00 am, the following moving behavior may be obtained: Cell 6&4: 8:00 am; Cell 3&2: 9:00 am.

According to the scenario as illustrated in FIG. 4A, it may be seen that the user sojourns for a long term within Cell IDs 6 and 4 between 0:00 am and 8:00 am; the user substantially sojourns within Cell IDs 2 and 3 between 9:00 am and 13:00 pm and between 15:00 pm and 19:00 pm; afterwards, after 9:00 am, the user is substantially located within Cell 6 and Cell 4. Thus, it may be determined based on the time information that the Cells 6&4 correspond to the home of the user, while Cells 3&2 correspond to the office of the user. In this example, two cells correspond to one location because the coverage of respective cells usually overlaps in a mobile communication network. Hence, even if the user does not move, the user's location may correspond to two cells due to such overlap. In other words, a single physical location may correspond to mobility data that indicates 2 cells that overlap.

It may be further determined whether a moving behavior has a middle stop. A middle stop will be described with reference to FIG. 4B, which illustrates a diagram of a method of determining a middle stop. An "entropy" distribution of the user within 24 hours a day is obtained based on the mobility data of the user.

The term "entropy," also called "transient entropy," is a variant corresponding to the moving speed of the user. The value of the entropy may be calculated in the following manner: determining a probability P, for a user sojourning in each cell i (i=1, . . . n) during a predetermined period of time (for example, 3 minutes, 5 minutes, or any suitable period of time selected based on an application), for example, the percentage of time the user sojourns in each cell i within a given period of time to a given length of a period of time); obtaining a dimensionless variant based on the probability $P_i$: $P_i \, Log_2 \, P_i$; then summing and negating the dimensionless variant to obtain the following equation:

$$E = -\sum_{i=1}^{n} P_i Log_2 P_i \qquad \text{Equation (1)}$$

The E just corresponds to the above term "entropy." In the same cell condition, a larger user entropy indicates a higher moving speed of the user within the period of time; and a smaller entropy indicates a lower moving speed of the user within the period of time. Thus, the entropy may be a measurement on speed.

Figure 4B:
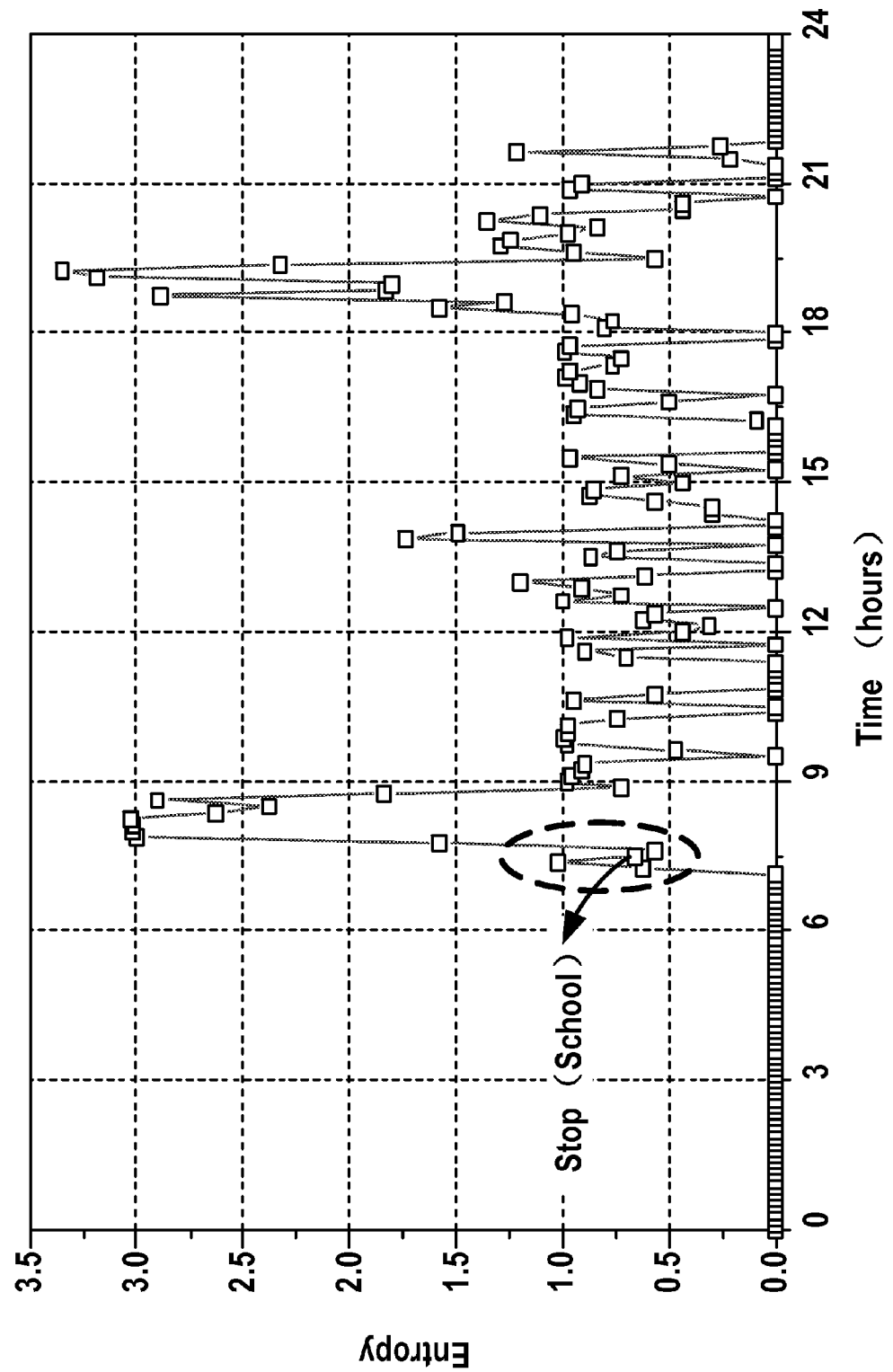
FIG. 4B schematically illustrates a diagram of identifying sojourn locations.

For example, as illustrated in FIG. 4B, it is clear that during the moving behavior between 7:00 am and 9:00 am, the user starts activity at around 7:00 am. However, during this moving period, entropy of the user decreases to a smaller value and then rises again. Based on this feature, it may be determined that the point corresponding to the smaller value is a sojourning site. As illustrated in FIG. 4B, the point as indicated by the arrows corresponds to middle sojourning sites.

It should be noted that such meaningful sojourning sites are different from other temporal/brief stops. For example, temporal stops caused by factors such as traffic lights are random and more brief than middle sojourning sites, while the middle sojourning sites in the sense of this inventive subject matter regularly appear daily and have a stronger regular nature. On this basis, middle sojourning sites or locations (also referred to as "meaningful sojourning sites") may be distinguished from other temporal stops (also referred to as "brief stops" or "brief temporal sites").

In this way, locations that are meaningful to each user and their corresponding time may be obtained to thereby determine the daily moving behavior of the user. Such information is statistical information obtained based on long-term mobility data of the user, which more accurately reflects the daily behaviors of the user.

The target for the moving behavior may be determined based on the nature and/or time as contained in the moving behavior. For some locations such as "home" and "office" as above mentioned, their natures may be determined based on time.

However, for some locations, it would be difficult to determine their meanings or functions merely based on time information. In an embodiment of the present inventive subject matter, meanings of locations may be identified using an existing geographical information system. For example, some locations, such as a school, a large shopping mall, a hospital, etc., may be selected from the geographical information system so as to match geographical coordinates of these locations with geographical locations of the cells thereby determining the meanings of corresponding locations. In this way, the purpose of a moving behavior may be determined. For example, it may be determined that the purpose is "shopping" based on the destination being a shopping mall. Further, the travel target may be determined by combining the time information of a location and the meaning of the location.

After obtaining the moving behavior and its purpose, the activity type of the user may be determined, for example, going to work, coming back from work, taking children to school, picking up children from school, going to work plus taking children to school, etc. These activity types may be given suitable names or are only characterized by data information containing location, time, and behavior target.

Through the above mentioned manners, the mobility data for all users may be analyzed to obtain various activity types of the users.

Next, at step 302 as illustrated in FIG. 3, travel information with respect to at least one of the activity types may be formed using the mobility data.

In particular, a corresponding origination-destination matrix O-D may be first constructed for each activity type. However, it should be noted that the travel information according to the present inventive subject matter is not so limited, but may be in any suitable manner.

FIG. 5A schematically illustrates an example of an O-D matrix structure, wherein the elements "1," "2," "3," and "4" in the first row represent the Cell IDs at the locations of originations, while the elements "1," "2," "3," and "4" in the first column represent the Cell IDs at the locations of destinations. As illustrated in the figure, upon initially constructing, the element "x" at intersections of rows and columns with identical Cell IDs represents the case of making no statistics or not existing; other data elements in the matrix are 0, which indicate the number of people starting from the area identified by a Cell ID in a corresponding column to the area identified by the Cell ID in a corresponding row.

The O-D matrices, for example, may be expressed as $H_i(t)$, wherein i=1, 2, 3, ..., n and represents a serial number of activity types; t represents time, namely the time with respect to the O-D matrix, which generally indicates a period of time, for example 7:00 am-9:00 am, 9:00 am-11:00 am, etc. As to the duration of the time period, it may be selected as required. The O-D matrix may be built based on one hour, 2 hours, and 3 hours, or any suitable period of time as required. The data between 6:00 am and 8:00 am may be obtained by combining the data in the O-D matrix between 6:00 am and 7:00 am and the data in the matrix between 7:00 am and 8:00 am.

Next, various activities of each user may be counted into the O-D matrix for a corresponding activity type. For example, based on the analysis result of the mobility data for each user obtained when identifying different activity types at step 301, various activities of each user may be counted into the O-D matrix for the corresponding activity type. Additionally, data analysis may be performed again for each user at this step so as to determine a relevant activity type.

For example, user 1 moves directly from Cell 1 to Cell 2, and its activity type is "going to work," then in the O-D matrix corresponding to this activity type pattern and behavior time, the element in the second row in the first column is plus 1. In such a way, the O-D matrices $H_i(t)$ for various activity types are generated gradually. FIG. 5B schematically illustrates a result of an O-D matrix for, for example, the "office" activity type within a certain period of time.

Preferably, corresponding travel information may be formed with respect to a part of various activity types as identified at step 301, namely forming travel information only for a concerned activity type or only for a dominant activity type.

Besides, travel modes of users can also be identified based on mobility data, for example, by a private car, by bus, by subway, by bike, and by foot, etc.

Identification of moving modes may be implemented in a plurality of ways. For example, it may be determined based on an average transient entropy, through a moving speed distribution, or based on the slope of the moving speed distribution. Further, it may be determined through associating a cellular phone number with a public transportation card number.

In one embodiment according to the present inventive subject matter, an average transient entropy (speed) of each user in an activity is calculated. It is known that under the same condition, a larger average transient entropy corresponds to a greater speed, while a smaller average transient entropy corresponds to a lower speed. Because the average moving velocities of different travel modes are generally different, different travel modes may be distinguished based on the average transient entropy. However, for users in different areas, due to various factors such as size of a cell, a user who is determined to have a larger average transient entropy based on the mobility data might not have a speed greater than a user who has a smaller average moving entropy. Thus, it is possible to cause misjudgment by means of average transient entropy.

Figure 4C:
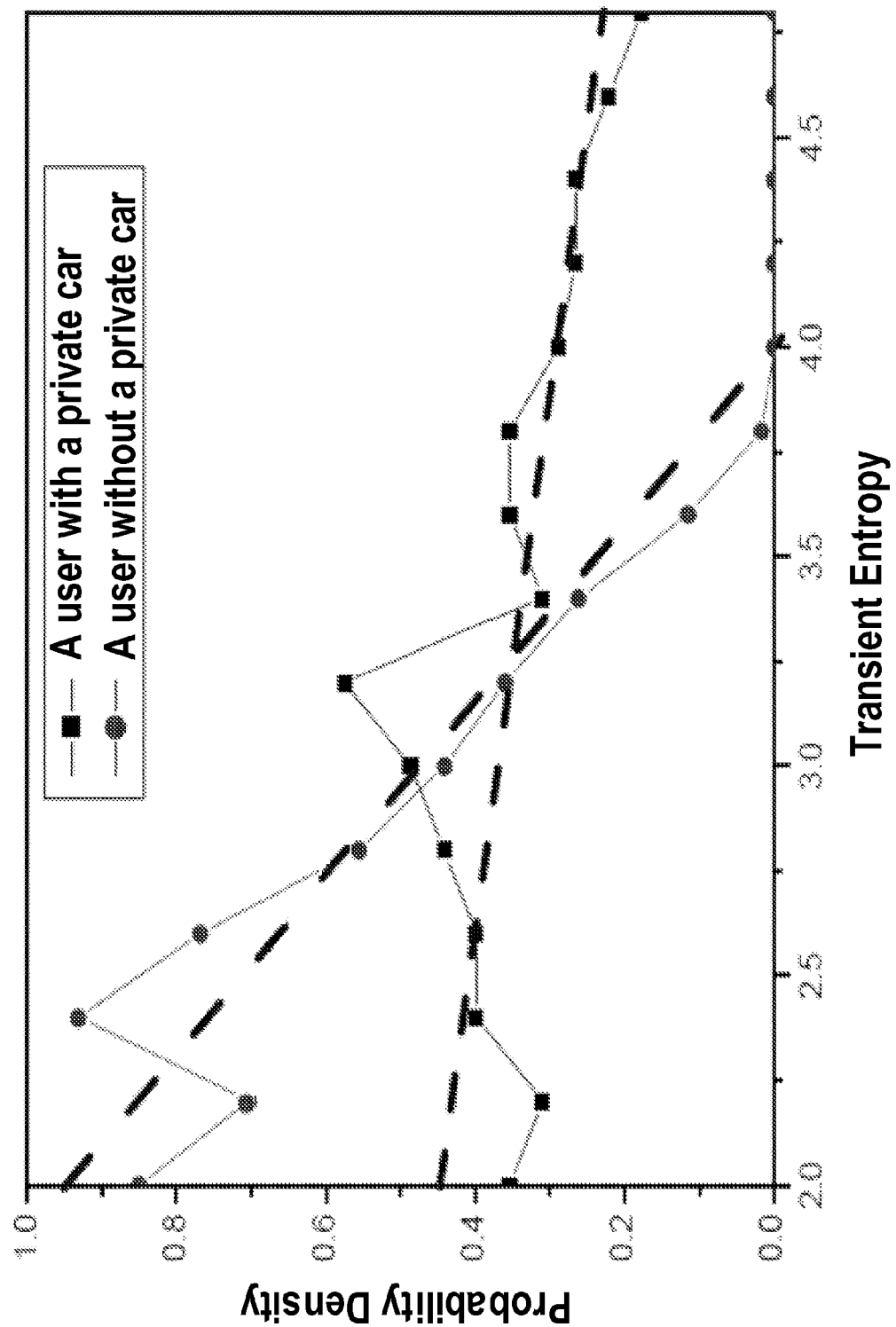
FIG. 4C schematically illustrates a diagram of a method of identifying a travel mode.

FIG. 4C also illustrates a diagram of a method of identifying travel modes of users. Specifically, this figure illustrates a relationship between a transient entropy and a probability density based on the mobility data of two users, wherein the X axis represents a transient entropy, and the Y axis represents the corresponding probability density. As illustrated in FIG. 4C, respective data points of the users may be connected to form corresponding curves, respectively; and then each curve is fitted with a straight line. A travel mode is determined based on the slopes of various straight lines. As illustrated in the figure, a user having a small absolute value of slope corresponds to a user traveling by private car, while a user having a larger absolute value of the slope corresponds to a user traveling by a non-private car. However, this technique has the possibility of misjudgment.

Figure 4D:
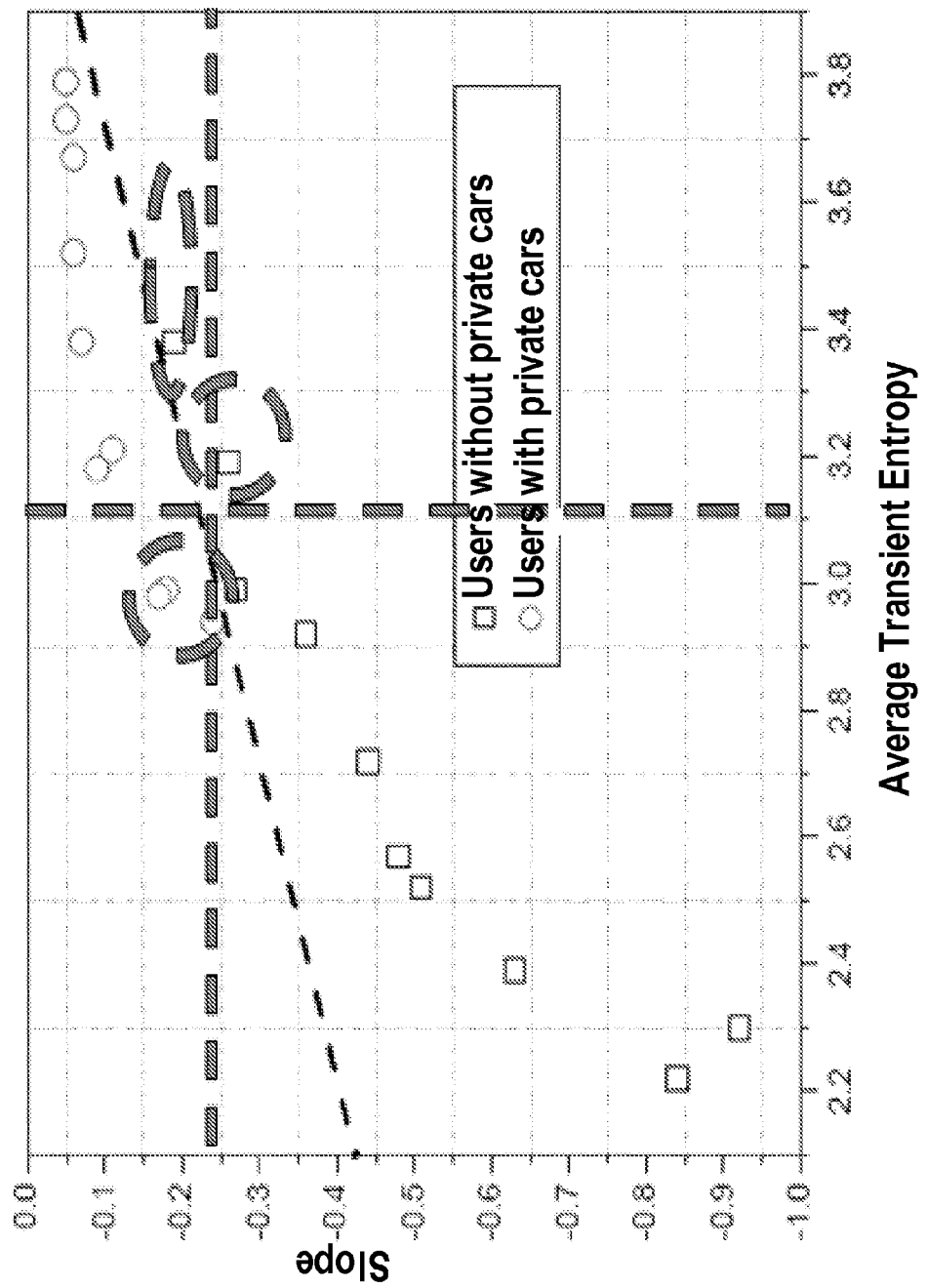
FIG. 4D schematically illustrates a diagram of another method of identifying the travel mode.

FIG. 4D illustrates a diagram of another method of identifying travel modes of users. This figure specifically illustrates circumstances in which the approaches for determining, through the average transient entropy, the slope, and combination of slope and average transient entropy information are adopted as determination criteria, respectively.

As illustrated in FIG. 4D, if the slope is employed alone (a bold transverse dotted line as illustrated in the figure), then users whose slopes are above the transversal dotted line should be users travelling by private cars. However, as illustrated in the utmost right dotted line rings in the figure, users traveling by non-private cars are also determined as users traveling by private cars; similarly, if an average transient entropy (a bold vertical dotted line as illustrated in the figure) is individually employed as the determining criteria, then the users at the left side of the vertical dotted line should be users travelling by non-private cars. However, based on this criteria, several users traveling by private cars are also determined as users traveling by non-private cars (as illustrated in the utmost left dotted-line rings), and several users traveling by non-private cars are determined as users traveling by private cars (as illustrated in the middle dotted-line rings in the figure). Thus, misjudgment exists in individually employing any of these individual approaches. However, if they are combined, misjudgment can be significantly eliminated by employing, for example, the slanting dotted line as the determining criteria illustrated in the figure.

Figure 4E:
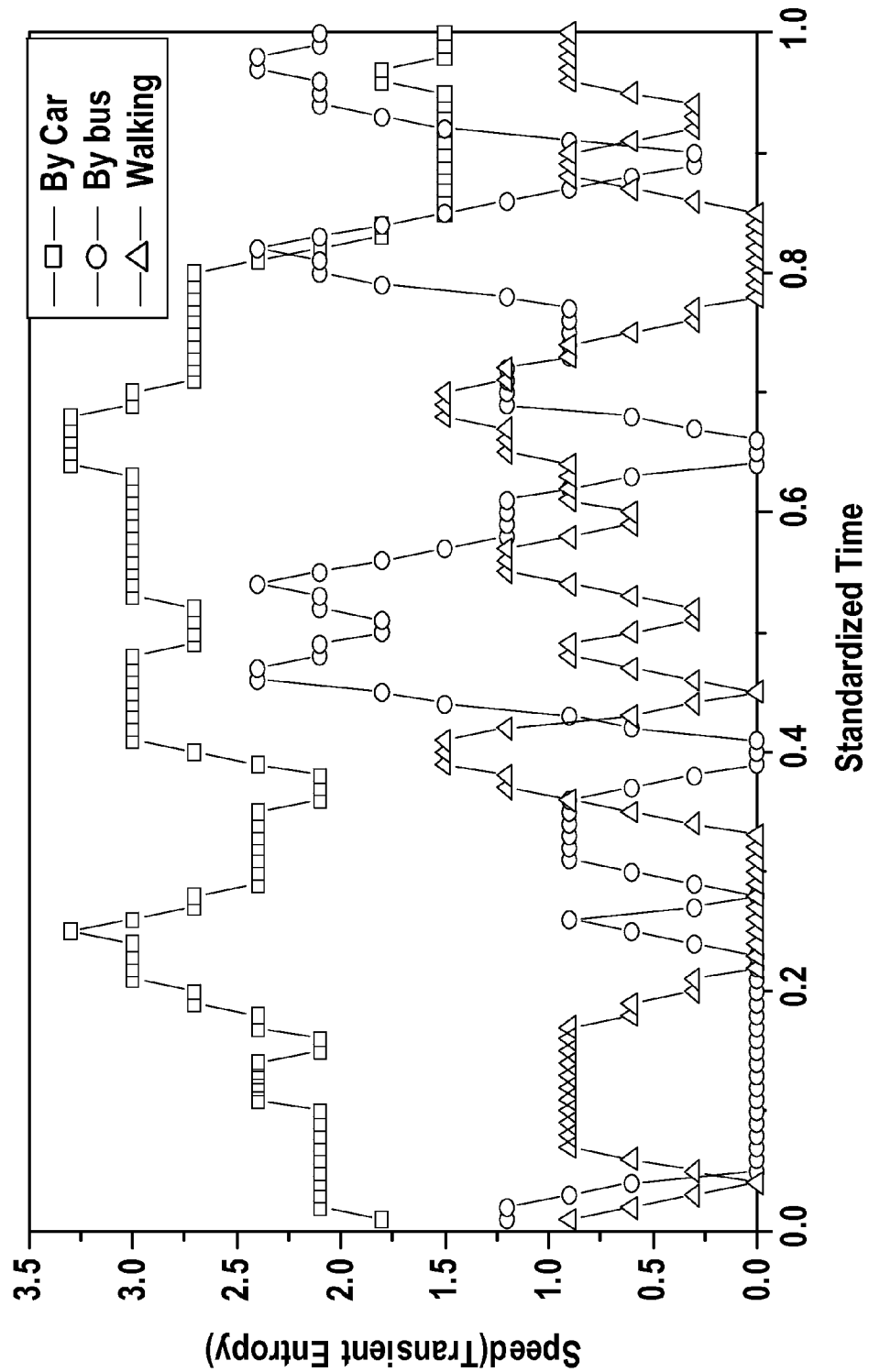
FIG. 4E schematically illustrates a diagram of a further method of identifying the travel mode.

FIG. 4E illustrates a diagram of a still further method of identifying travel modes of users. This figure specifically illustrates a speed (transient entropy) distribution situation within standardized time as obtained based on mobility data of three users. In this figure, the X axis represents standardized time, while the Y axis represents speed or transient entropy. The data of the three users are represented by blocks, rings, and triangular blocks, respectively. As illustrated in the figure, from the speed distribution within standardized time, it is seen that the average speed for the user represented by blocks is relatively high, the highest speed is very high (as high as 3.3), which is a typical characteristic of travel by car; the speed of the user represented by rings change greatly, and the highest speed is relatively higher but does not exceed 2.5, periodically having the lowest speed of 0, which is therefore a typical characteristic of travel by bus. Additionally, the average speed of the user represented by triangular blocks is relatively low, with a highest speed of 1.5, which is a typical characteristic of pedestrian.

Various kinds of travel modes may be identified in the above exemplary manners. The travel mode information may be for example stored in an additional table as additional information to the O-D matrix. The travel mode information, for example, may indicate the numbers or percentages of various travel modes among the population flow from one cell to another cell. However, it should be noted that the above embodiments have been illustrated only for exemplary purposes. The present inventive subject matter is not so limited, but may employ any other suitable manner to identify a travel mode.

The present inventive subject matter can automatically identify various activity types of people from the mobility data actually reflecting users' daily activities and establish travel information with respect to various activity types based on the mobility data. Therefore, the present inventive subject matter not only mitigates the lag from from static data acquisition and inability of static data techniques to adapt to social development and change, but the present inventive subject matter also provides more accurate transportation demand data in a more intelligent way. In addition, the present inventive subject matter provides a possibility to predict and estimate changes of travel demands in response to a travel-related event.

It should be noted that in the above embodiments, activity situation of a user within one day may be obtained based on the mobility data. However, the present inventive subject matter is not so limited, but may obtain activity situation within other periods of time, for example, one week.

Figure 6:
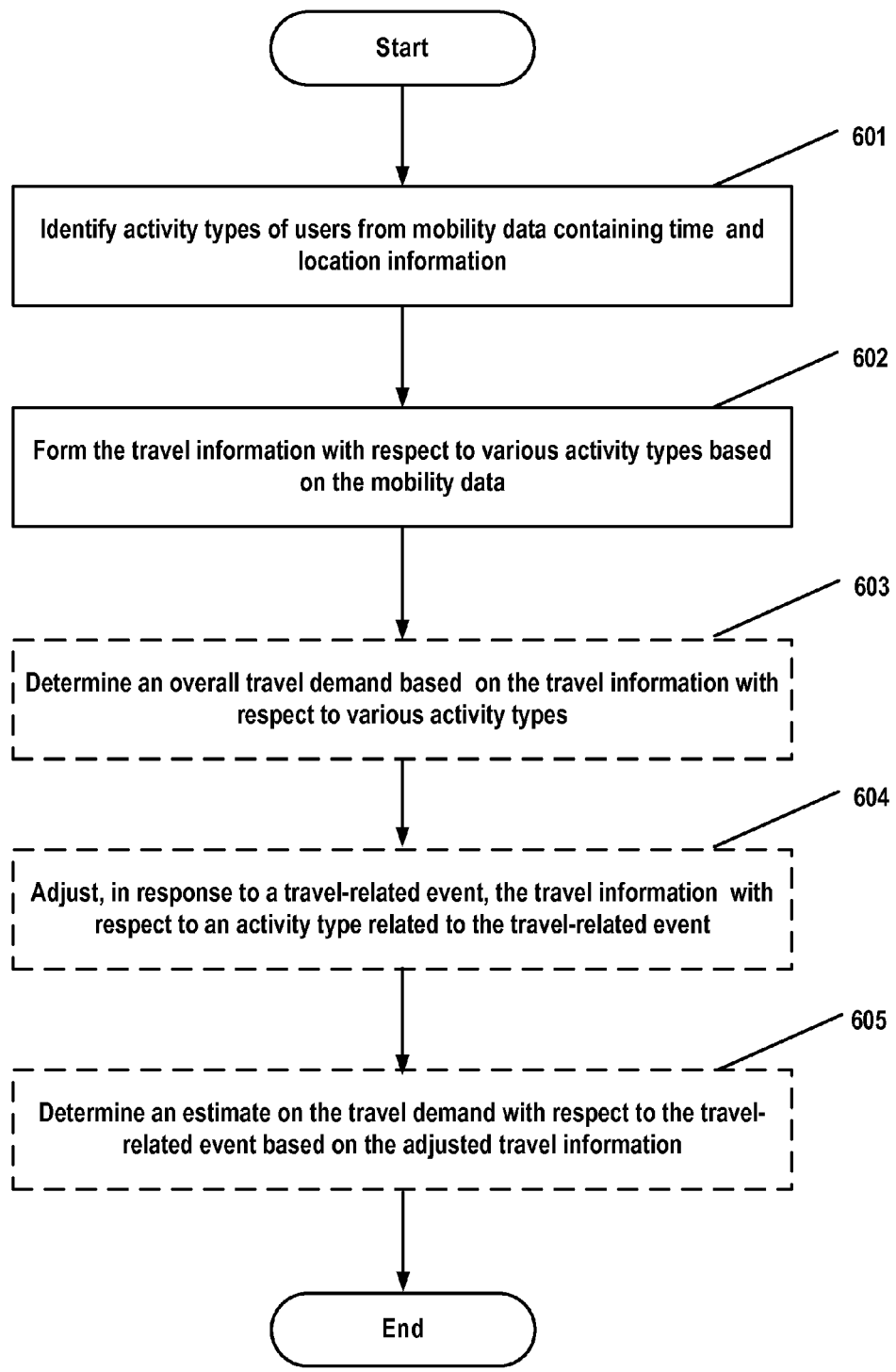
FIG. 6 illustrates a flowchart of a method of providing travel information according to another embodiment of the present invention.

Additionally, FIG. 6 further illustrates a flowchart of a method of providing travel information according to another embodiment of the present inventive subject matter.

As illustrated in FIG. 6, step 601 and step 602 are similar to step 301 and step 302 as illustrated in FIG. 3, respectively, which will not be detailed for the sake of simplification. As illustrated in FIG. 6, after forming travel information with respect to various activity types, an overall travel demand may be further determined at step 603 based on the travel information with respect to each activity type. This will be described with reference to FIGS. 7A to 7C, which schematically illustrate three different kinds of activity types.

Figure 7A:
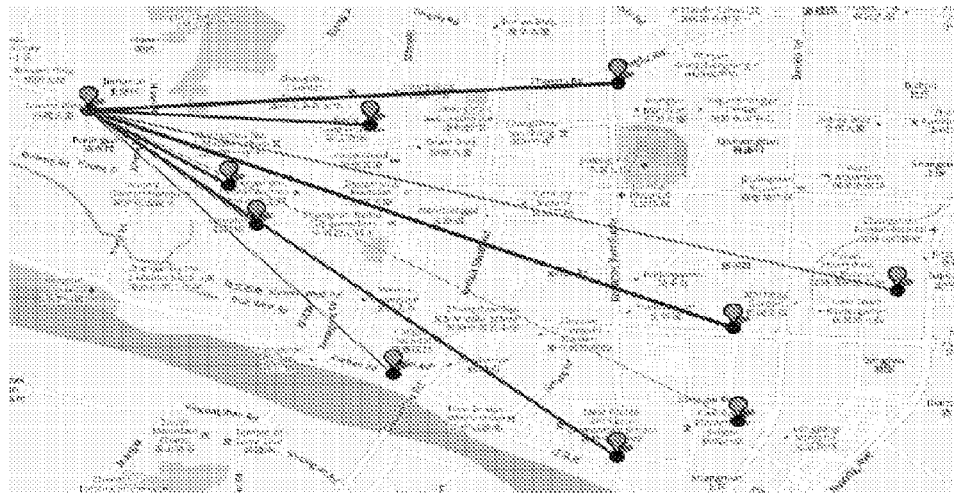
FIG. 7A, 7B, and FIG. 7C schematically illustrate diagrams of travel conditions of three kinds of activity types.
Figure 7B:
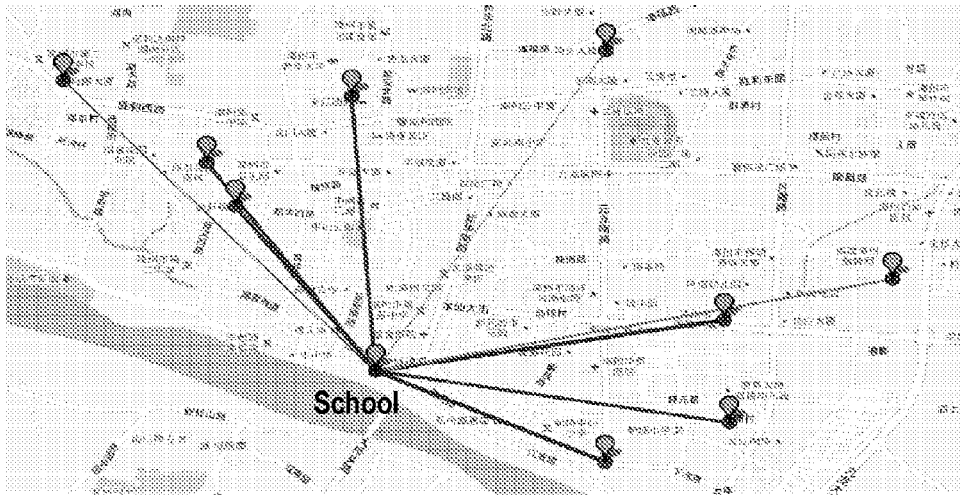
Figure 7C:
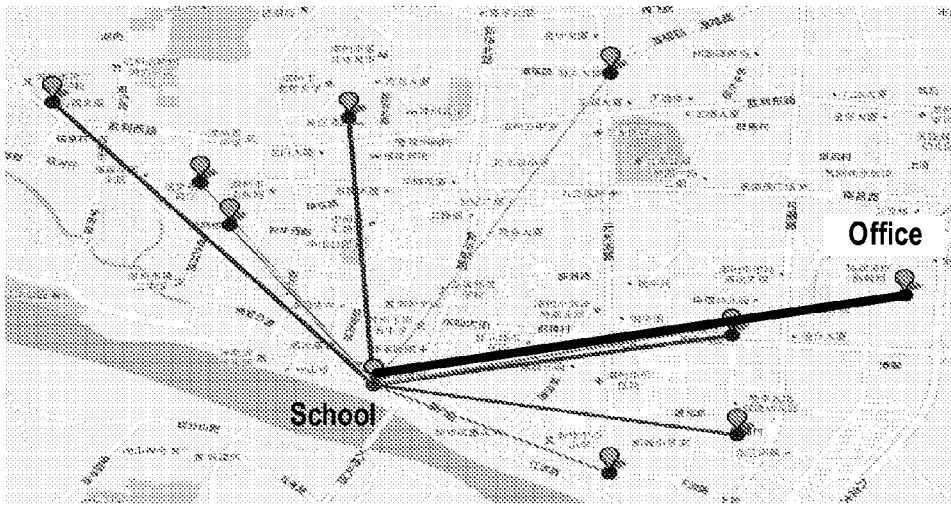

FIG. 7A illustrates a travel situation under the activity type of for example "going to work," and a corresponding O-D matrix established for this activity type, for example, may be expressed as $H_1(t)$; FIG. 7B illustrates a travel situation for the activity type of for example "taking children to school," and its corresponding O-D matrix, for example, may be expressed as $H_2(t)$; and FIG. 7C illustrates the travel situation for the activity type of for example "taking children to school in the way of going to work," and its corresponding O-D matrix may be expressed as $H_3(t)$.

When it is required to determine the overall demand, various types of O-D matrixes may be combined to determine the overall demand. It may be expressed by the following equation:

$$S = \sum_{i=1}^{n} H_i(t) \qquad \text{Equation 2}$$

In this way, the overall travel demand data may be obtained through synthesizing the O-D matrix data of various activity types.

Further, at step 604, in response to a travel-related event, the travel information with respect to a travel-related event may be further adjusted, so as to obtain the adjusted travel information.

Upon receipt of the travel-related event, the feature of the travel-related event may be analyzed to determine the activity type to be influenced thereby. Next, adjustment may be performed only to the travel information related to the activity type to be influenced. For example, for the "adjusted work hours" regulation, if it is regulated that the working time be changed from 8:00 am to 9:00 am, then merely those users who need not take children to school might postpone the travel due to this regulation, while to those users who have to take children to school (assuming that the school time generally starts from 8:00 am), they generally would not change their travel. Thus, travel information may be adjusted towards only the activities of those users who directly go to work.

Figure 7D:
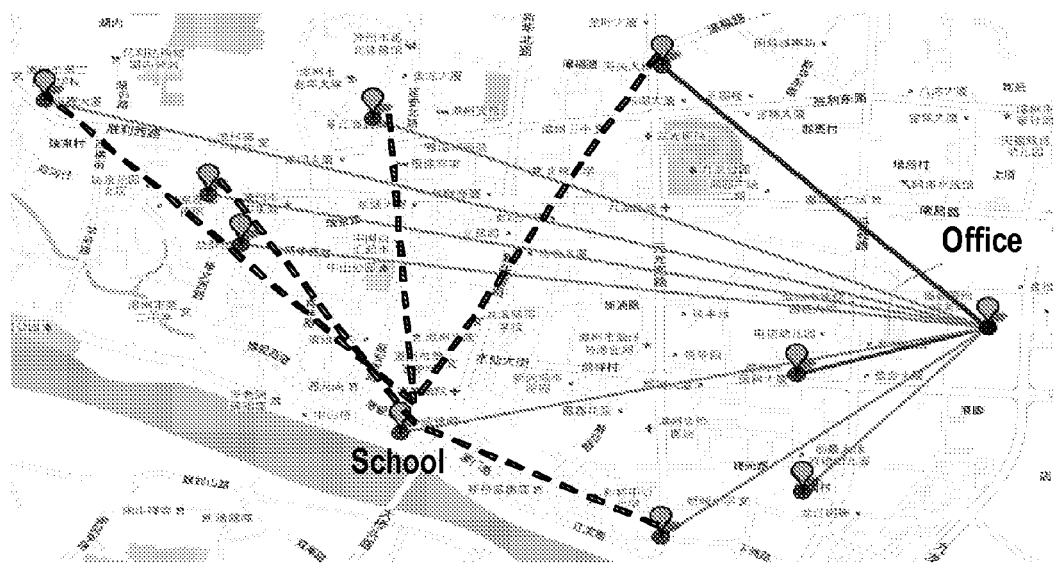
FIG. 7D schematically illustrates the adjusted travel conditions of the activity types as illustrated in FIG. 7C.

FIG. 7D schematically illustrates a case of an activity type which is influenced by a travel-related event, which, for example, may be identified as $F(H_3(t))$, where $F(\ )$ denotes adjustment performed towards $H_3(t)$.

Further, it may determine at step 605 the adjusted travel demand with respect to the travel-related event based on the adjusted travel information.

After the above adjustment, travel information with respect to various activity types may be synthesized to determine the travel demand estimate with respect to the travel-related event, wherein the estimate S' may, for example, be expressed by the following equation:

$$S' = F(H_j(t)) + \sum_{i \ne j}^{n} H_i(t) \qquad \text{Equation 3}$$

In this way, a more reliable travel demand estimate may be obtained for various kinds of behavior-related events, thereby providing data basis on which the measure can be taken and the decision can be made with respect to the event.

It should be noted that hereinbefore the present inventive subject matter has been previously described with respect to transportation-related applications. However, the present inventive subject matter may also be applied to any other suitable field. For example, a plurality of concerned locations within a certain area may be selected, for example, a shopping area, to obtain the travel information related to these concerned locations as well as the population flow condition regarding these locations, thereby determining whether it is necessary to build a new shopping mall. Besides, a location of a new shopping mall may be hypothesized, and, based on this hypothesis, the adjusted travel information is obtained so as to determine whether the location of this hypothetical shopping mall is proper.

Figure 8:
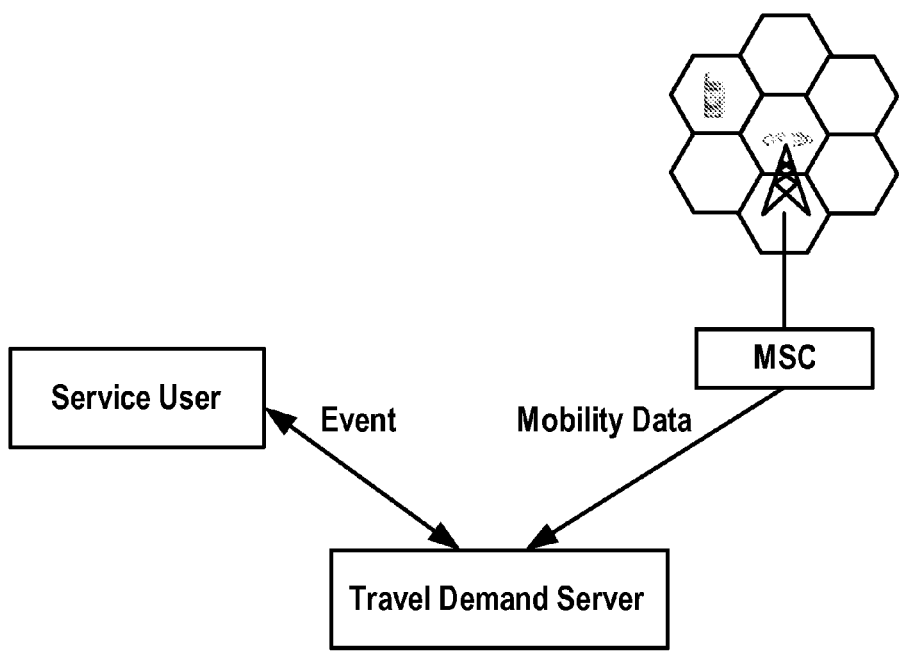
FIG. 8 schematically illustrates a system architecture of an application environment of a method according to the present invention.

FIG. 8 schematically illustrates a systematic architecture of an application environment of the present inventive subject matter. As illustrated in FIG. 8, mobility data of users are sent to the MSC via a base station and stored therein. A travel information server capable of implementing the present inventive subject matter obtains the mobility data in the MSC. These mobility data are analyzed and travel information with respect to various activity types is formed. A service user, for example, a transportation department or a transportation planning department, may obtain the travel information from the travel information server, thereby forming travel demand data. Besides, the service user may also input a travel-related event, and the travel information server may adjust or modify corresponding travel information in response to the event, and obtain a travel demand estimate with respect to the travel-related event preferably based on the adjusted travel information.

Figure 9:
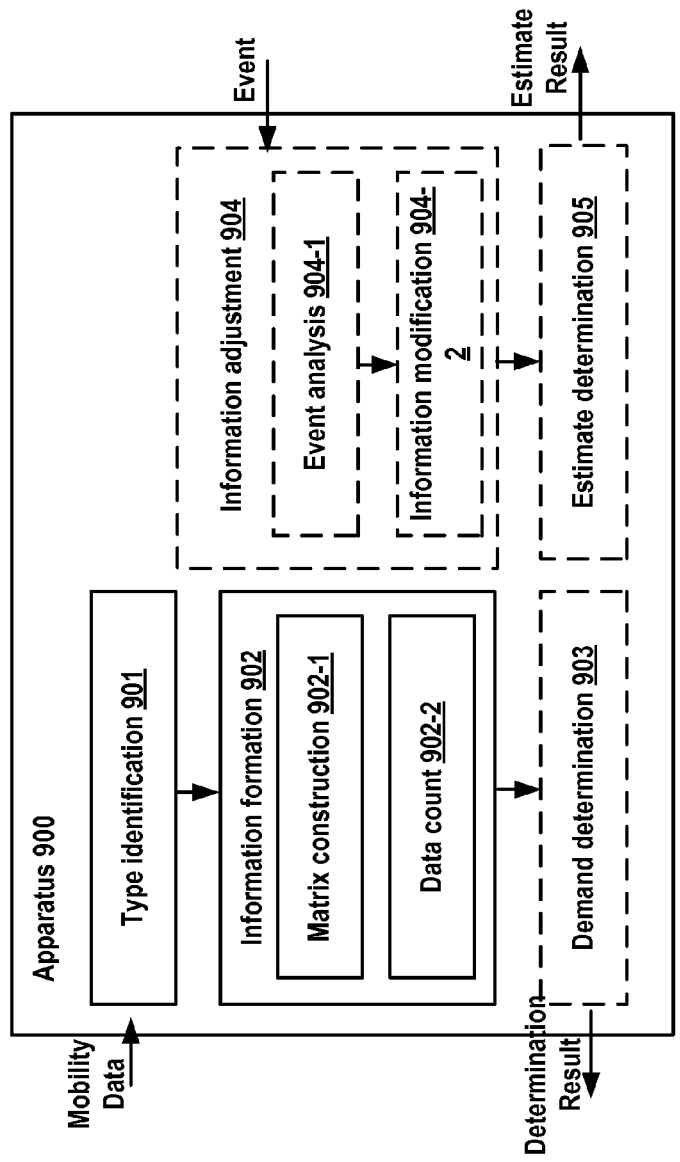
FIG. 9 schematically illustrates a block diagram of an apparatus for providing travel information according to the present invention.

Further, FIG. 9 further illustrates an apparatus for providing travel information according to an embodiment of the present inventive subject matter.

As illustrated in FIG. 9, the apparatus 900 may comprise a type identification unit 901 and an information formation unit 902, wherein the type identifying unit 901 is for identifying activity types of users from mobility data containing time and location information; and information formation unit 902 is for forming travel information with respect to various activity types based on the mobility data.

In one embodiment according to the present inventive subject matter, the type identification unit 901 may be configured to determine daily moving behaviors of the users based on the mobility data and to determine the purpose of the moving behaviors based on the nature of a location and/or time for the moving behaviors, so as to determine the activity types.

According to another embodiment of the present inventive subject matter, the information formation unit 902 is configured to only form the travel information with respect to the activity type of interest.

In a further embodiment of the present inventive subject matter, the travel information may be in a form of O-D matrix, and the information may comprise origination, destination, population flow, and travel mode.

In a still further embodiment of the present inventive subject matter, the information formation unit 902 further comprises a matrix construction unit 902-1 for constructing an O-D matrix for each of activity types; and a data count unit 902-2 for counting data related to each of activity types of each user into the O-D matrix for a corresponding activity type.

In a yet further embodiment of the present inventive subject matter, the apparatus 900 may further comprise demand determination unit 903, for determining an overall travel demand based on the travel information with respect to various activity types.

In a further embodiment of the present inventive subject matter, the apparatus 900 may further comprise an information adjustment unit 904 for, in response to a travel-related event, adjusting the travel information with respect to an activity type related to the travel-related event.

In a still further embodiment of the present inventive subject matter, the information adjustment unit 904 comprises event analysis unit 904-1 for performing an analysis on the travel-related event so as to determine an activity type to be influenced based on feature of the travel-related event; and information with respect to the activity type to be influenced.

In a yet further embodiment of the present inventive subject matter, the apparatus 900 further comprises estimation determination unit 905 for determining an estimate on a travel demand for the travel-related event based on the adjusted travel information.

The mobility data may comprise one or more of: call data, SMS data, webpage browsing data, packet switched data, and location cell handover data.

For detailed operations of respective unit in the apparatus 900 for providing travel information, please refer to the specific descriptions of the methods for providing travel information in conjunction with FIG. 3 to FIG. 7D and the systematic architecture of the application environment of the present inventive subject matter in conjunction with FIG. 8.

Figure 10:
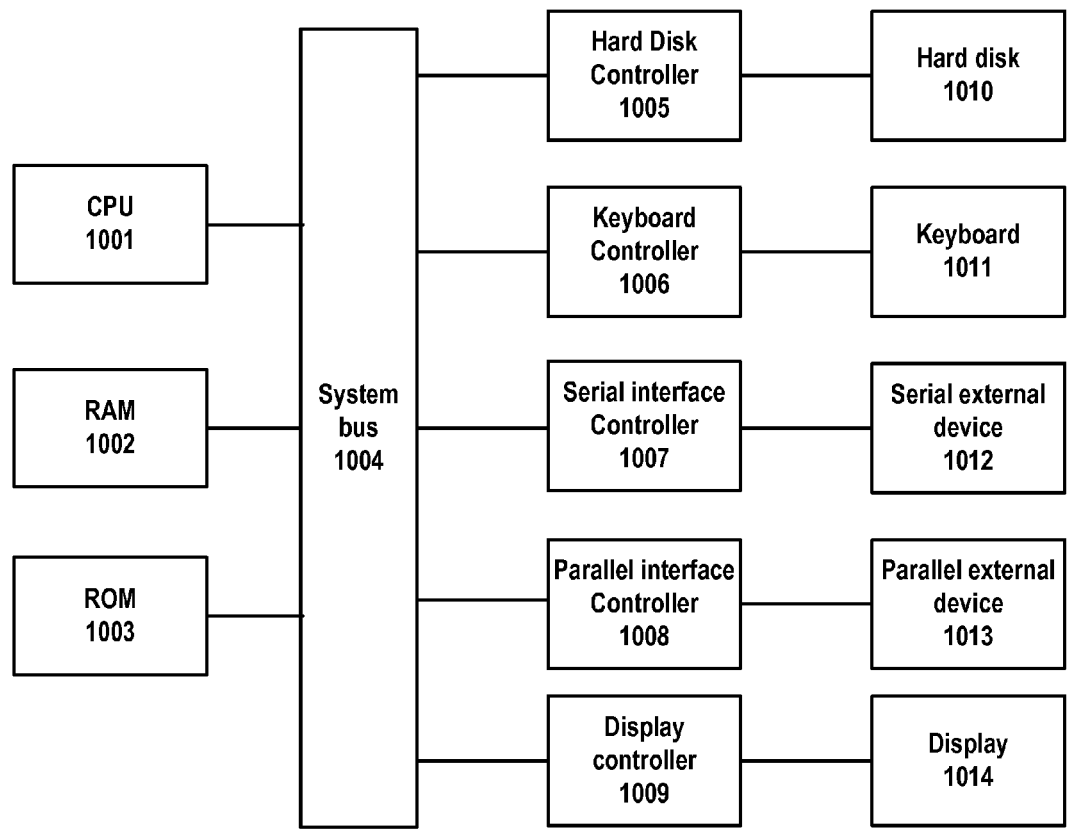
FIG. 10 schematically illustrates a structural block diagram of a computer device in which embodiments of the present invention can be implemented.

Hereinafter, a computer device in which the present inventive subject matter can be implemented will be described with reference to FIG. 10. FIG. 10 shows a structural block diagram of a computer device capable of implementing the embodiments according to the present inventive subject matter.

The computer system as shown in FIG. 10 includes a CPU (Central Processing Unit) 1001, a RAM (Random Access Memory) 1002, a ROM (Read Only Memory) 1003, a system bus 1004, a hard disk controller 1005, a keyboard controller 1006, a serial interface controller 1007, a parallel interface controller 1008, a display controller 1009, a hard disk 1010, a keyboard 1011, a serial peripheral device 1012, a parallel peripheral device 1013 and a display 1014. Among these components, connected to the system bus 1004 are the CPU 1001, the RAM 1002, the ROM 1003, the hard disk controller 1005, the keyboard controller 1006, the serial interface controller 1007, the parallel interface controller 1008 and the display controller 1009. The hard disk 1010 is connected to the hard disk controller 1005; the keyboard 1011 is connected to the keyboard controller 1006; the serial peripheral device 1012 is connected to the serial interface controller 1007; the parallel peripheral device 1013 is connected to the parallel interface controller 1008; and the display 1014 is connected to the display controller 1009.

The structural block diagram in FIG. 10 is shown only for illustration purpose, and is not intended to limit the inventive subject matter. In some cases, some devices can be added or reduced as required.

Further, the embodiments of the present inventive subject matter can be implemented in software, hardware or the combination thereof. The hardware part can be implemented by a special logic; the software part can be stored in a memory and executed by a proper instruction execution system such as a microprocessor or a dedicated designed hardware. The normally skilled in the art may understand that the above method and system may be implemented with a computer-executable instruction and/or in a processor control code, for example, such code is provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry such as a very large scale integrated circuit or gate array, a semiconductor for example logical chip or transistor, or programmable hardware device for example a field-programmable gate array, or a programmable logical device, or implemented by software executed by various kinds of processors, or implemented by combination of the above hardware circuitry and software.

Although the present inventive subject matter has been described with reference to the embodiments of the present inventive subject matter considered by far, it should be understood that the inventive subject matter is not limited to the embodiments disclosed herein. On the contrary, all modifications and equivalent arrangements that fall within the spirit and range of the appended claims are intended to be embraced therein. The scope of the appended claims is accorded with the broadest interpretation to encompass all such modifications and equivalent structures and functions.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   identifying activity types of users based, at least in part, on mobility data of the users, wherein the mobility data has been collected over time and indicates at least locations and corresponding times at the locations;
   generating, by a processor, travel information with the mobility data for each of the activity types, wherein said generating travel information with the mobility data for each of the activity types comprises generating an origin-destination matrix for each of the identified activity types, wherein the origin-destination matrix indicates a number of users that travel between each pair of the origins and the destinations for the activity type;
   adjusting the travel information for a first of the activity types based, at least in part, on travel-related event data that corresponds to the first activity type to generate an adjusted travel information for the first activity type, wherein the travel-related event data indicates an event that potentially influences travel for a short term;
   computing, by the processor or another processor, an estimated overall travel demand with a combination of the adjusted travel information for the first activity type and the travel information for at least a second of the activity types, wherein the combination of the adjusted travel information comprises a combination of the origin-destination matrix for the first activity type and the origin-destination matrix for the second activity type.

2. The method of claim 1, wherein the mobility data comprises at least one of call data, short message service data, web page browsing data, public transportation transaction data, location area handover control data, and packet switched data.

3. The method of claim 1 further comprising collecting the mobility data from a plurality of mobile switching centers over a period of time.

4. The method of claim 1, wherein the event comprises one of a transportation regulation, a change in traffic flow, a change in work hours, a change in school hours, a traffic accident, and a construction event.

5. The method of claim 1, wherein said identifying activity types of users, based at least in part, on mobility data of users comprises:
- determining durations of the users within different cell locations with the mobility data;
- determining geographic locations that correspond to the different cell locations based, at least in part, on established correspondence between the different cell locations and respective ones of the geographic locations; and
- identifying the activity types based on the durations and the geographic locations.

6. The method of claim 5 further comprising establishing a correspondence between each of the different cell locations in one or more mobile communication networks and corresponding ones of the geographic locations determined with a geographical information system.

7. The method of claim 5, wherein said identifying the activity types is also based on beginning and ending times of the durations at the different cell locations.

8. The method of claim 1 further comprising determining origins and destinations for each of the users based, at least in part, on the mobility data.

9. The method of claim 8, wherein said determining origins and destinations for each of the users based, at least in part, on the mobility data comprises:
- computing an approximate average moving speed for the user within given periods of time;
- classifying those of the locations that precede a transition from a prolonged lack of movement with respect to duration of lack of movement at other locations of the user to a greater moving speed as origins at corresponding times;
- classifying those of the locations that correspond with prolonged lack of movement as destinations at corresponding times.

10. The method of claim 8 further comprising classifying those of the locations that correspond to a low moving speed for short periods of time as middle stop locations.

* * * * *